US011073846B2

United States Patent
Lull et al.

(10) Patent No.: US 11,073,846 B2
(45) Date of Patent: Jul. 27, 2021

(54) MASS FLOW CONTROLLER WITH ABSOLUTE AND DIFFERENTIAL PRESSURE TRANSDUCER

(71) Applicant: Illinois Tool Works Inc., Glenview, IL (US)

(72) Inventors: John Lull, Glenview, IL (US); Anthony Kehoe, Glenview, IL (US); Berwin Banares, Glenview, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 159 days.

(21) Appl. No.: 16/195,432

(22) Filed: Nov. 19, 2018

(65) Prior Publication Data

US 2019/0235533 A1   Aug. 1, 2019

Related U.S. Application Data

(60) Provisional application No. 62/624,059, filed on Jan. 30, 2018.

(51) Int. Cl.
*G05D 7/06* (2006.01)
*G01F 1/38* (2006.01)
*G01F 1/00* (2006.01)

(52) U.S. Cl.
CPC ............. *G05D 7/0635* (2013.01); *G01F 1/00* (2013.01); *G01F 1/383* (2013.01)

(58) Field of Classification Search
CPC ......... G05D 7/0635; G01F 1/00; G01F 1/383; G01F 15/002
See application file for complete search history.

(56) References Cited

U.S. PATENT DOCUMENTS

| | | | | |
|---|---|---|---|---|
| 9,562,796 B2* | 2/2017 | Lull | ........................ | G01F 1/50 |
| 10,309,810 B2* | 6/2019 | Hataita | ................... | G01F 1/383 |
| 2002/0082703 A1* | 6/2002 | Repicci | ................. | A61F 2/3836 |
| | | | | 623/20.29 |

(Continued)

FOREIGN PATENT DOCUMENTS

| | | |
|---|---|---|
| GB | 2381589 A | 5/2003 |
| WO | 2015034663 A2 | 3/2015 |

OTHER PUBLICATIONS

International Search report & Written Opinion issued in corresponding International Application No. PCT/US2018/062127 dated Mar. 6, 2019 (16 pages).

*Primary Examiner* — P. Macade Nichols
(74) *Attorney, Agent, or Firm* — McGuireWoods LLP (57) ABSTRACT

Included are mass flow controllers and methods of use. An example mass flow controller comprises a flow pathway through the mass flow controller; the flow pathway comprising a first cavity and a second cavity. The mass flow controller further comprises a laminar flow element. The mass flow controller additionally comprises a combination absolute and differential pressure transducer assembly comprising: a third cavity in fluid communication with the first cavity, an absolute pressure transducer exposed to absolute pressure in the third cavity, and a differential pressure transducer exposed to differential pressure between the third cavity and the second cavity. The mass flow controller also comprises a flow control valve assembly downstream of the laminar flow element and the combination absolute and differential pressure transducer assembly.

9 Claims, 4 Drawing Sheets

(56) References Cited

U.S. PATENT DOCUMENTS

2005/0016592 A1\* 1/2005 Jeromson ............ F16K 37/0083
137/487.5
2010/0070240 A1 3/2010 Yasuda et al.

\* cited by examiner

MASS FLOW CONTROLLER WITH ABSOLUTE AND DIFFERENTIAL PRESSURE TRANSDUCER

CROSS REFERENCE TO RELATED APPLICATION

This application claims priority to U.S. Provisional Patent Application No. 62/624,059, filed Jan. 30, 2018, entitled "Mass Flow Controller with Absolute and Differential Pressure Transducer," the entire contents of which are hereby fully incorporated by reference for all purposes.

TECHNICAL FIELD

The present invention relates generally to methods and systems for controlling the mass flow rate of a fluid, and more particularly to the operation of mass flow controllers and mass flow meters for gases and other compressible fluids.

BACKGROUND

Many industrial processes require precise control of various process fluids. For example, in the semiconductor industries, mass flow meters and their associated controllers may be able to precisely measure and control the amount of a process fluid that is introduced to a process chamber. A wide variety of techniques may be used to measure the mass flow rate in these devices, including thermal, ultrasonic time-of-flight, coriolis, and pressure-based techniques.

Pressure-based mass flow meters use a defined flow restriction to create a pressure drop responsive to the flow to be measured, and use measurements of temperature, the resulting pressure drop, and (for compressible fluids) absolute pressure, combined with the knowledge of both the fluid's properties and the flow restriction, to calculate the mass flow rate.

While semiconductor processes (e.g., etch) may operate with near zero outlet pressures (referred to as a "hard vacuum", e.g., below about 2 psia), certain semiconductor processes, such as chemical vapor deposition, may sometimes experience large back pressure excursions with pressures downstream of the control valve reaching atmospheric pressure or greater. These large downstream variations in pressure may necessitate the use of absolute pressure sensors with downstream laminar flow elements on the pressure-based mass flow controllers. In addition, the upward swing from the near zero outlet pressure to an atmospheric outlet pressure may reduce the low-flow pressure drop of the flow restrictor by as much as a factor of 50 or more in devices with a downstream flow sensor. Thus, this transition may induce the resultant flow sensor signal to be reduced by potentially a factor of 50 or more. The reduced flow sensor signal may further cause the flow sensor signal-to-noise ratio and the stability to degrade, which may result in poor repeatability and accuracy for the operating conditions above near zero outlet pressure when at low setpoints.

SUMMARY

In an embodiment, a mass flow controller is provided. An example mass flow controller comprises a flow pathway through the mass flow controller; the flow pathway comprising a first cavity and a second cavity. The mass flow controller further comprises a laminar flow element adjacent to the first cavity and the second cavity; wherein the first cavity is upstream of the laminar flow element and the second cavity is downstream of the laminar flow element. The mass flow controller additionally comprises a combination absolute and differential pressure transducer assembly comprising: a third cavity in fluid communication with the first cavity, an absolute pressure transducer having an absolute pressure membrane and exposed to absolute pressure in the third cavity, and a differential pressure transducer having a first differential pressure membrane and a second differential pressure membrane and exposed to differential pressure between the third cavity and the second cavity. The mass flow controller also comprises a flow control valve assembly configured to control a flow of fluid through the flow pathway; wherein the flow control valve assembly is downstream of the laminar flow element and the combination absolute and differential pressure transducer assembly.

Additionally or alternatively, the mass flow controller may include one or more of the following features individually or in combination. The mass flow controller may further comprise an inlet orifice block. The inlet orifice block may comprise an inlet diameter of about 0.010 inches to about 0.070 inches. The mass flow controller may further comprise a PID controller. The PID controller may be configured to convert the absolute pressure, the differential pressure, and knowledge of fluid properties and laminar flow element characteristics into a signal indicative of mass flow rate through the laminar flow element; receive a setpoint signal indicative of a desired flow rate through the laminar flow element; and control the valve drive signal such that the signal indicative of mass flow rate through the laminar flow element substantially matches the received setpoint signal. The desired flow rate of the setpoint signal may be less than or equal to 10%. The flow pathway may further comprise an outlet and wherein the outlet comprises a pressure above 2 psia. The mass flow controller may further comprise a circuit board. The combination absolute and differential pressure transducer assembly may be configured to sense the absolute and differential pressure upstream of the flow control valve assembly. The third cavity may be filled with a fluid.

In an embodiment, a method of controlling flow is provided. An example method comprises providing a mass flow controller comprising: a flow pathway through the mass flow controller; the flow pathway comprising a first cavity and a second cavity, a laminar flow element adjacent to the first cavity and the second cavity; wherein the first cavity is upstream of the laminar flow element and the second cavity is downstream of the laminar flow element, a combination absolute and differential pressure transducer assembly comprising: a third cavity in fluid communication with the first cavity, an absolute pressure transducer having an absolute pressure membrane and exposed to absolute pressure in the third cavity, and a differential pressure transducer having a first differential pressure membrane and a second differential pressure membrane and exposed to differential pressure between the third cavity and the second cavity, and a flow control valve assembly comprising a control valve and configured to control a flow of fluid through the flow pathway; wherein the flow control valve assembly is downstream of the laminar flow element and the combination absolute and differential pressure transducer assembly. The method further comprises flowing a fluid through the flow pathway; and actuating the control valve.

Additionally or alternatively, the method may include one or more of the following features individually or in combination. The mass flow controller may further comprise an inlet orifice block. The inlet orifice block may comprise an inlet diameter of about 0.010 inches to about 0.070 inches.

The mass flow controller may further comprise a PID controller. The PID controller may be configured to convert the absolute pressure, the differential pressure, and knowledge of fluid properties and laminar flow element characteristics into a signal indicative of mass flow rate through the laminar flow element; receive a setpoint signal indicative of a desired flow rate through the laminar flow element; and control the valve drive signal such that the signal indicative of mass flow rate through the laminar flow element substantially matches the received setpoint signal. The desired flow rate of the setpoint signal may be less than or equal to 10%. The flow pathway may further comprise an outlet and wherein the outlet comprises a pressure above 2 psia. The mass flow controller may further comprise a circuit board. The combination absolute and differential pressure transducer assembly may sense the absolute and differential pressure upstream of the flow control valve assembly. The third cavity may be filled with a fluid. The fluid may be used in a semiconductor process.

BRIEF DESCRIPTION OF THE DRAWINGS

Illustrative examples of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different examples may be implemented.

DETAILED DESCRIPTION

The present invention relates generally to methods and systems for controlling the mass flow rate of a fluid, and more particularly to the operation of mass flow controllers and mass flow meters for gases and other compressible fluids. Unless otherwise indicated, all numbers expressing quantities of components, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

The term "fluid" is used herein to describe any type of matter in any state capable of flow. The term "gas" is used herein to describe any fluid for which density is substantially dependent on absolute pressure, such as ideal or non-ideal gases, vapors, and supercritical fluids. The term "liquid" is used herein to describe any fluid for which density is not substantially dependent on absolute pressure.

Pressure-based mass flow controllers (hereafter "MFCs") and mass flow meters (hereafter "MFMs"), when used to control the flow of gases, may typically utilize some form of a flow restrictor and two or more absolute pressure transducers placed in suitable locations downstream of the control valve to allow calculation of absolute pressure both upstream and downstream of the flow restrictor. For instance, many pressure-based MFMs use a type of flow restrictor known as a laminar flow element whose performance is predominantly determined by its laminar flow characteristics, rather than by velocity head (the pressure drop required to accelerate the gas to its velocity in the restrictor). To a first order, the flow rate of an ideal gas through a laminar flow element can be calculated as shown in Equation 1:

$$Qs = K^*(Pi^2 - Po^2) \quad \text{(Eq. 1)}$$

Where:

Qs is the mass flow rate

K is a value dependent on temperature, viscosity, compressibility of the gas, and the geometry of the laminar flow element Pi is the absolute pressure at the inlet upstream of the laminar flow element Po is the absolute pressure at the outlet downstream of the laminar flow element However, and as discussed above, in some semiconductor processes the upward swing from the near zero outlet pressure (e.g., below about 2 psia) to an atmospheric outlet pressure may shift the low-flow pressure drop of the flow sensor by as much as a factor of 50 or more in those devices with a flow sensor downstream of the control valve. Thus, this transition may induce the resultant flow sensor signal to be potentially reduced by a factor of 50 or more. The reduced flow sensor signal may cause the flow sensor signal-to-noise ratio and the stability to degrade, resulting in poor repeatability and accuracy for the operating conditions above near zero outlet pressure when at low setpoints.

With a flow sensor upstream of the control valve, the metering accuracy and the device full-scale flow range may become insensitive to the pressure downstream of the control valve. For example, in current MFC designs solving for K for a MFC that has a full-scale $N_2$ reference flow rate of 100 sccm at Pi and Po pressures of 7.0 psia and 0.1 psia, respectively, provides a K of approximately 2.0412. If this K is used to solve for the Pi that would occur when at a 1 sccm $N_2$ flow and a stated Po of 0.1 psia, a Pi of 0.707 psia is obtained, which equates to a pressure difference of 0.607 psia. This pressure difference is well outside the minimum resolvable pressure differences of approximately 0.01 psid that are routinely measured by absolute pressure sensors. Thus, reasonably low error values for the MFC should be obtainable for low setpoints when the MFC is operated with a near zero outlet pressure (i.e., below about 2 psia). However, if the Po is increased to approximately 14.7 psia (a typical value that routinely occurs in certain semiconductor processes such as chemical vapor deposition), the corresponding Pi required to have a 1 sccm $N_2$ flow on this same device would equate to approximately 14.7167 psia. This is only a 0.0167 psia difference, which is extremely close to the minimum accuracy obtainable with typical absolute pressure transducers. As such, these MFCs with laminar flow elements and absolute pressure sensors downstream of the control valve may not operate effectively at low setpoints with outlet pressures significantly above hard vacuum. For example, the flow sensor signal-to-noise ratio and the stability can degrade.

However, if the absolute flow sensor and laminar flow element is upstream of the control valve, variations downstream of the control valve may have no impact on the upstream absolute flow sensor. Furthermore, the upstream pressures are typically held to within +/−10% of the nominal inlet pressure in a typical semiconductor processing environment. In addition, to provide better accuracy in situations where the pressure difference between the upstream and downstream pressure locations is small, one of the absolute pressure transducers may be replaced by a differential pressure transducer. As such, with the use of a differential pressure transducer, Equation 1 may now be rewritten as below:

$$Qs = K^*(2Pi \times \Delta P)\Delta P \quad \text{(Eq. 2)}$$

$$Qs = K^*(2Po + \Delta P)\Delta P \quad \text{(Eq. 3)}$$

Where:

$$\Delta P = Pi - Po$$

Equation 2 may be used in embodiments where the absolute pressure transducer is located upstream of the laminar flow element. Equation 3 may be used in embodiments where the absolute pressure transducer is downstream of the laminar flow element. Solving Equation 2 for a 100 sccm $N_2$ flow at a typical Pi of 35 psia, and a $\Delta P$ of 0.86 psid (allowing reasonable margin for a 1 psid range transducer) at that full scale flow rate, results in a K of 1.6818. With K known, Equation 2 may be solved for the $\Delta P$ at 1 sccm when the Pi is 30, 35, and 40 psia. The resultant values are pressure drops of 0.0099 psid at the 30 psia pressure inlet, 0.0085 psid at the 35 psia pressure inlet, and 0.0074 psid at the 40 psia pressure inlet. As such, with typical upstream inlet pressure variations, the variation in the differential pressure may be far less with a laminar flow element upstream of the control valve than with a downstream laminar flow element and its associated downstream pressure variations. Furthermore, differential pressure transducers may be selected with a typical differential pressure accuracy of 0.0005 psid providing far more accuracy than currently available with absolute pressure transducers. Thus, the use of a differential pressure transducer in conjunction with an absolute transducer and flow restrictor upstream of the control valve, as opposed to the use a flow restrictor with two absolute pressure transducers downstream of the control valve, may result in more repeatable flow estimates at desired low setpoints as the inlet pressure varies.

Although the following discussion applies primarily to gas flow meters, the combination absolute and differential pressure transducers disclosed herein may also be useful in a liquid flow controller (where it could provide information useful to the control system), even though liquid flow meters are relatively insensitive to absolute pressure so are otherwise typically well served using only a differential transducer.

Figure 1:
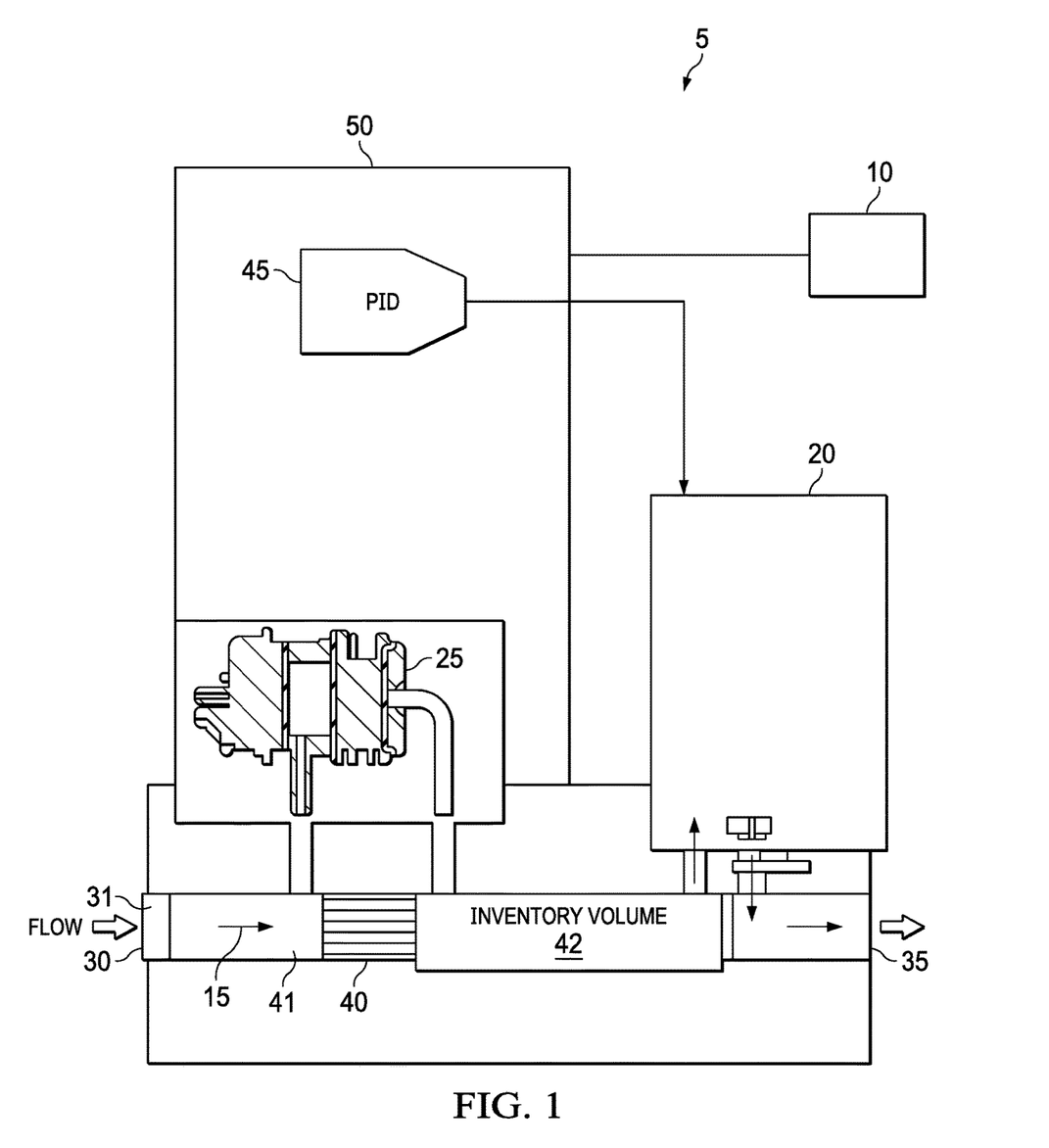
FIG. 1 is an illustration of a schematic of a pressure-based mass flow controller with a flow sensor upstream of the valve in accordance with certain embodiments of the present disclosure.

FIG. 1 illustrates a schematic of a pressure-based MFC 5 with a flow sensor upstream of the valve in accordance with certain embodiments of the present disclosure. The MFC 5 operates on the principle that changes in fluid flow rate produce changes in the fluid pressure upstream and/or downstream of a flow restrictor, such as a laminar flow element, from which the fluid flow rate may be calculated.

In the depicted embodiment, the MFC 5 comprises a power supply connector 10, a flow pathway 15, a flow control valve assembly 20, and at least one embodiment of a combination absolute and differential pressure transducer assembly 25. The MFC 5 further comprises an inlet port 30 for introducing a fluid into the device and an outlet port 35 from which the fluid exits (e.g., to a processing chamber). In some embodiments, inlet port 30 may further comprise an inlet orifice block 31 disposed within inlet port 30 and blocking at least a portion of fluid flow therethrough. Fluid may enter MFC 5 via the inlet port 30 and flow within the MFC 5 along the flow pathway 15. In some embodiments, the flow pathway 15 may be maintained at a constant temperature. The flow control valve assembly 20 is positioned along the flow pathway 15 proximate the outlet port 35 and downstream of both the laminar flow element 40 combination absolute and differential pressure transducer assembly 25. The flow control valve assembly 20 may comprise a proportional control valve (e.g., a solenoid or piezo control valve) that is adjustable to control the amount of fluid passing through the MFC 5. The flow control valve assembly 20 may actuate the control valve at any desired rate sufficient for controlling flow through the flow control valve assembly 20. Further, the actuation rate may be programmable and adjustable so that the control valve may be actuated continuously or in a stair-step process.

Figure 3:
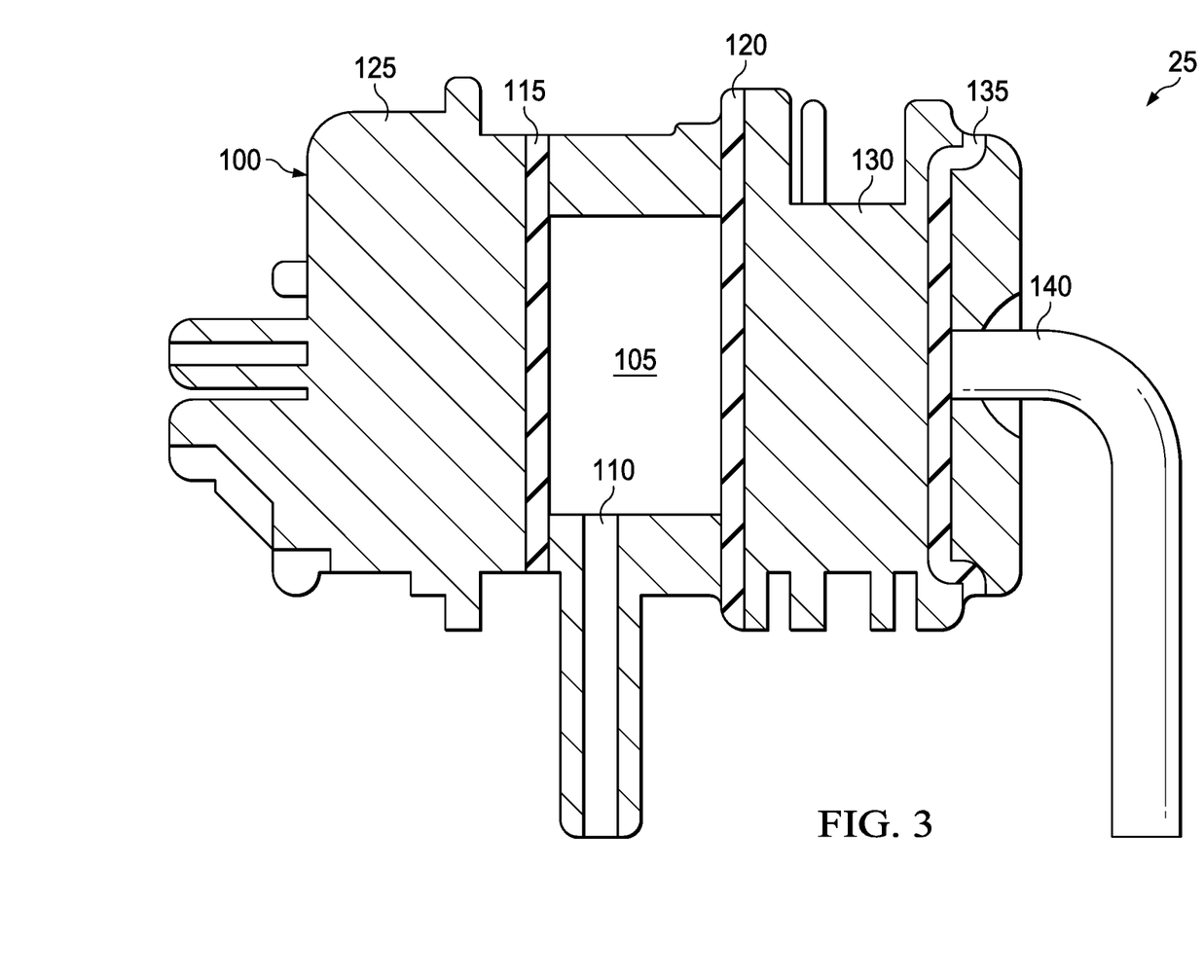
FIG. 3 is an illustration of a schematic of a combination absolute and differential pressure transducer assembly in accordance with certain embodiments of the present disclosure.

Inlet orifice block 31 may comprise an inlet that is sized such to ensure that the pressure drop across the differential transducer (as illustrated in FIG. 3 below) is not able to exceed 10 psid when, for example, a 60 psia inlet pressure is applied to the inlet port 30 when the MFC 5 is at near zero pressure and the flow control valve assembly 20 is closed or when near zero pressure is applied to the inlet port 30 with the MFC 5 at, for example, 60 psia and the flow control valve assembly 20 is closed. Although FIG. 1 depicts the use of an inlet orifice block 31, it is to be understood that other flow restrictive devices may be used to protect the differential pressure transducer from pressure spikes. Excessive pressure spikes at outlet 35 may be mitigated by a firmware check implemented with the PID controller 45 described below. This firmware check may be used to close the valve of the flow control valve assembly 20 whenever a pressure drop exceeds 10 psid.

The sizing of the inlet orifice requires solving the two dominant differential equations governing fluid flow:
1. Conservation of mass.
2. Conservation of momentum of fluid flow.

Figure 2:
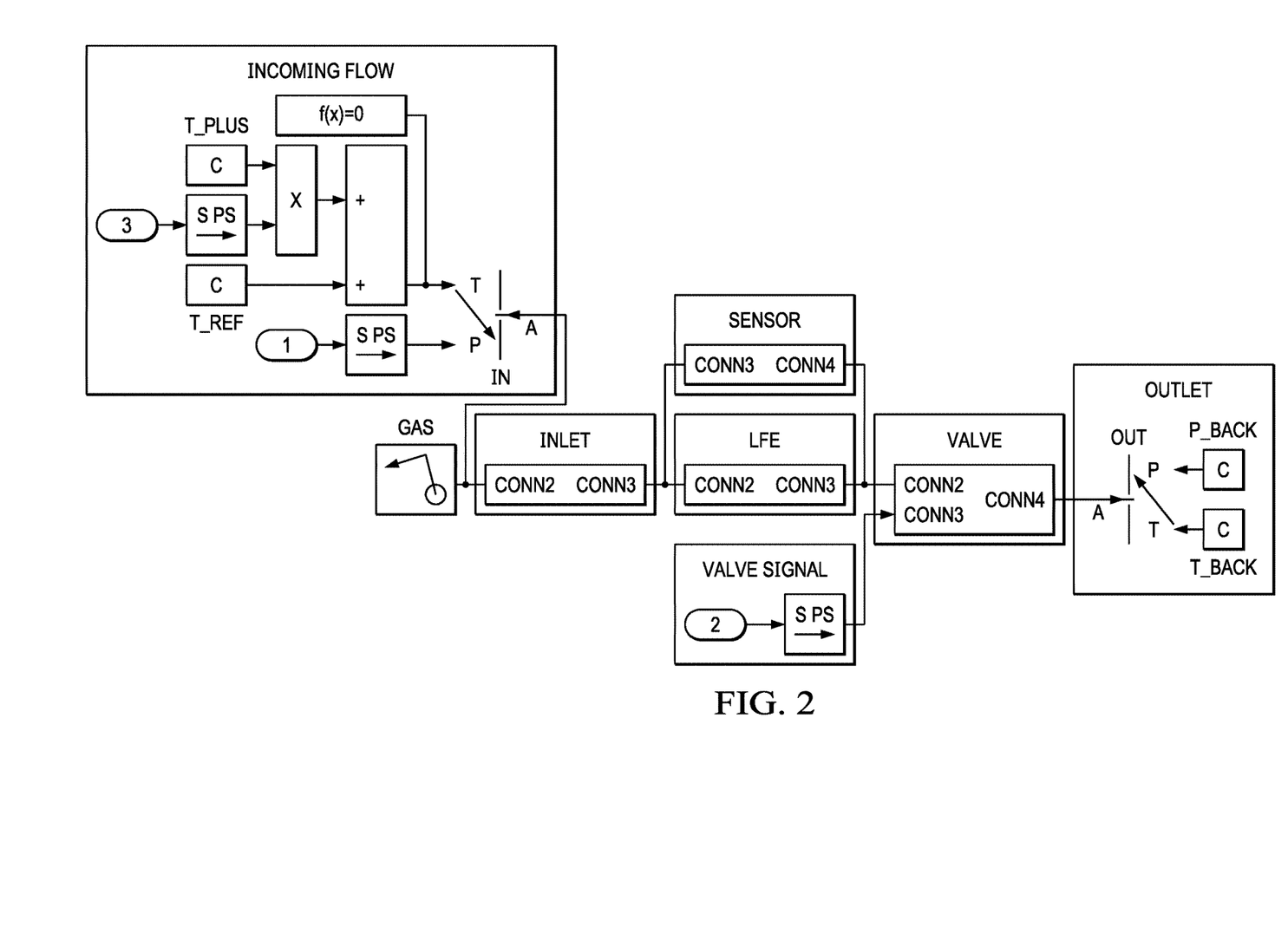
FIG. 2 is an example physical symbolic model that may be used to size the inlet orifice of an inlet orifice block in accordance with certain embodiments of the present disclosure.

The solution may be obtained via construction of a physical symbolic model using available tools such as Matlab's Simscape physical modeling package. FIG. 2 is an example physical symbolic model that may be used to size the inlet orifice. Inserting typical values for the various mechanical components, and then cycling through the various gases that may be used in MFC 5 results in the following orifice sizes for MFCs designed to operate with nominal $N_2$ flow rates as shown below in Table I.

It should be noted that the results shown in Table 1 are representative only for this mechanical configuration of MFC 5. Updating the Matlab Simscape Model to use reflect these different mechanical configurations will result in different inlet orifice sizes.

TABLE 1

Typical Inlet Orifice Dimensions to Prevent dp Sensor Damage from a 60 psi Pressure transient

| N2 Flow (sccm) | Inlet Orifice Diameter (inches) |
|---|---|
| 30 | 0.010 |
| 100 | 0.011 |
| 1000 | 0.021 |
| 10000 | 0.063 |

The inlet orifice may be used to prevent permanent mechanical damage to the differential pressure transducer during a typical machine startup (e.g., charging the MFC) or shutdown (e.g., evacuating the MFC). An example inlet of the inlet orifice block 31 comprises a diameter of about 0.010 inches to about 0.070 inches.

With continued reference to FIG. 1, the MFC 5 further comprises a laminar flow element 40 upstream from the flow control valve assembly 20. An MFC with a laminar flow element 40 upstream of the flow control valve assembly 20 and designed for use with a low-range differential transducer is able to operate at much lower inlet pressures than a corresponding pressure based MFC with the laminar flow element downstream of the flow control valve assembly but designed to operate over a similarly wide outlet pressure range. The laminar flow element 40 may be configured to ensure laminar flow within small flow channels, creating a pressure drop due to the shear forces within the fluid. The combination absolute and differential pressure transducer assembly 25 may be coupled to the flow pathway 15 upstream from the flow control valve assembly 20. The combination absolute and differential pressure transducer assembly 25 comprises at least one absolute pressure transducer and at least one differential pressure transducer (illustrated in FIG. 3 below). The combination absolute and differential pressure transducer assembly 25 determines the absolute pressure, as well as the differential pressure drop across the laminar flow element 40. As such, the laminar flow element 40 bifurcates the flow pathway 15 into two portions comprising individual cavities. Upstream of the laminar flow element 40 is the first portion of the flow pathway 15, a first cavity referred to as the feed volume 41. The feed volume 41 comprises a volume of fluid fed into the inlet 30 of the MFC 5, said fluid volume having not progressed through the laminar flow element 40. Downstream of the laminar flow element 40 is disposed the second portion of the flow pathway 15, a second cavity referred to as the inventory volume 42 from which the flow to the flow control valve assembly 20 proceeds. The inventory volume 42 comprises a volume of fluid that has progressed through the laminar flow element 40. Both cavities of the feed volume 41 and the inventory volume 42 may be media isolated and filled with a silicone oil or other suitable liquid as desired. Fluid volume within the feed volume 41 may be maximized relative to the inventory volume 42 as fluid volume upstream of the combination absolute and differential pressure transducer assembly 25 may help slow down pressure transients in the MFC 5 either in response to deliberate changes in fluid flow, or resulting from pressure changes upstream of the inlet orifice block 31. Fluid volume in the inventory volume 42 may be minimized relative to the fluid volume within the feed volume 41 as increasing fluid volume in the inventory volume 42 relative to the feed volume 41 may negatively affect performance in some applications as this increased fluid volume may affect sensitivity of the MFC 5 to pressure transients. As such, the upstream cavity referred to as the feed volume 41 may be configured to be larger and/or contain a larger fluid volume relative to the inventory volume 42 downstream of the laminar flow element 40 and the combination absolute and differential pressure transducer assembly 25.

Continuing with FIG. 1, the MFC 5 further comprises a proportional-integral-derivative (hereafter "PID") controller 45 that may comprise logic, circuitry, memory, and one or more processing elements (processors). Although a PID controller is illustrated in this specific example, it is to be understood that the PID controller is but one of many potential valve controllers as will be readily apparent to one of ordinary skill in the art. For example, in some embodiments, the PID controller 45 may be substituted for a lead-lag controller, a gain-lead-lag controller (e.g., as described in U.S. Pat. No. 6,962,164 incorporated in its entirety by reference herein), or any other controller sufficient for the application. The controller may be implemented as either hardware or firmware. The PID controller 45 is configured to control the position of the valve within the flow control valve assembly 20 in accordance with a setpoint indicating the desired mass flow rate. For instance, in one embodiment the PID controller 45 receives the absolute pressure and the differential pressure from the combination absolute and differential pressure transducer assembly 25 and a setpoint signal indicative of a desired flow rate through the laminar flow element 40. The PID controller 45 uses the received information to convert the absolute pressure, the differential pressure, and knowledge of both the fluid properties and characteristics of the laminar flow element 40 into a signal indicative of the mass flow rate through the laminar flow element 40. For example, in one embodiment the PID controller 45 is configured to use Equation 1 to relate the pressure drop to a volumetric flow rate, which may then be converted to a mass flow rate using density correction at a given temperature and pressure. The PID controller 45 may then generate a valve drive signal for controlling the flow control valve assembly 20 such that the signal indicative of mass flow rate through the laminar flow element 40 substantially matches the received setpoint signal. For example, in one embodiment a control valve drive signal is generated based upon an error signal that is the difference between the set point signal indicative of the desired mass flow rate of the fluid and a feedback signal that is related to the actual mass flow rate determined by the PID controller 45 using the combination absolute and differential pressure transducer assembly 25. In some examples a desired flow rate of the setpoint signal is less than or equal to 10%. In some examples, the outlet pressure may be above about 2 psia.

In one embodiment a circuit board 50 may be attached to the back of the combination absolute and differential pressure transducer assembly 25. In certain embodiments the circuit board 50 may include flash memory and a flex cable connector. The circuit board 50 may also provide a location to mount any transducer-specific balance or other trim resistors. In some embodiments the circuit board 50 may have memory components that are configured to store data such as, but not limited to, calibration data for the combination absolute and differential pressure transducer assembly 25. The circuit board 50 may include one or more accelerometers to allow automatic correction for the effects of gravity or acceleration on the measured pressures. The circuit board 50 may also include instrumentation amplifiers or other amplifiers configured to amplify output signals of the absolute pressure transducer and the differential pressure transducer, as well as other components. The circuit board 50 may be supported by pins from the combination absolute and differential pressure transducer assembly 25 providing the electrical connections with the absolute and differential pressure transducers contained within the combination absolute and differential pressure transducer assembly 25. In some embodiments the circuit board 50 may include one or more notches or holes to provide clearance around any absolute and differential transducer mounting screw heads.

FIG. 3 illustrates a schematic of the combination absolute and differential pressure transducer assembly 25. The combination absolute and differential pressure transducer assembly 25 comprises a body 100 having one cavity, referred to as the transducer assembly cavity 105, which is in fluidic communication with the feed volume 41. In some embodiments, the transducer assembly cavity 105 is formed by the assembly 25 connecting the absolute sensor to the upstream side of the pressure differential sensor. In addition, there is another smaller cavity on the downstream side of the differential sensor. The smaller downstream is cavity formed by the welded capping of the downstream differential pressure transducer. The volumes in the upstream and downstream portions of the combined pressure sensor also contribute to the feed volume and inventory volumes. The transducer assembly cavity 105 may be exposed to pressures upstream of the laminar flow element (e.g., laminar flow element 40 as illustrated in FIG. 1) via pressure port 110. As an example, in one embodiment the pressure port 110 is a seal detail machined into the face of the body 100. Adjacent to the transducer assembly cavity 105 are the absolute pressure membrane 115 and the upstream differential pressure membrane 120. The absolute pressure membrane 115 is a component of absolute pressure transducer 125. The upstream differential pressure membrane 120 is a component of the differential pressure transducer 130 which further comprises a downstream differential pressure membrane 135 that is exposed to pressures downstream of the laminar flow element (e.g., laminar flow element 40 as illustrated in FIG. 1) via pressure port 140. The absolute pressure membrane 115, upstream differential pressure membrane 120, and downstream differential pressure membrane 135 may comprise a flexible corrugated metal diaphragm. The transducer assembly cavity 105 may be media isolated and filled with a silicone oil or other suitable liquid. The absolute pressure transducer 125 may report the absolute pressure in the transducer assembly cavity 105. In one embodiment the absolute pressure transducer 125 may comprise a piezoresistive semiconductor pressure sensor, although other technologies could be used. In the disclosed embodiments the differential pressure transducer 130 reports the differential pressure of the opposing sides of the laminar flow element. In one embodiment the differential pressure transducer 130 may comprise a piezoresistive semiconductor pressure transducer, although other technologies could be used.

In one embodiment the absolute pressure membrane 115, upstream differential pressure membrane 120, and downstream differential pressure membrane 135 may comprise thin flexible diaphragms manufactured from any suitable metal such as high-purity stainless steel or Hastelloy® (a registered trademark of Haynes International), or other suitable materials. The thin metal diaphragms may be manufactured to have a precisely-specified profile (e.g., a profile specified to +/−0.15 mm) and be positioned to project slightly from a face of either the absolute pressure transducer 125 or the differential pressure transducer 130.

In the illustrated embodiment, pressure ports 110 and 140 are co-located. Co-location of the ports 110 and 140 may be a preferred embodiment for high-flow application where velocity head may be a significant contributor to the pressure drop, and where small changes in port location may make a significant change in the sensed pressure.

Figure 4:
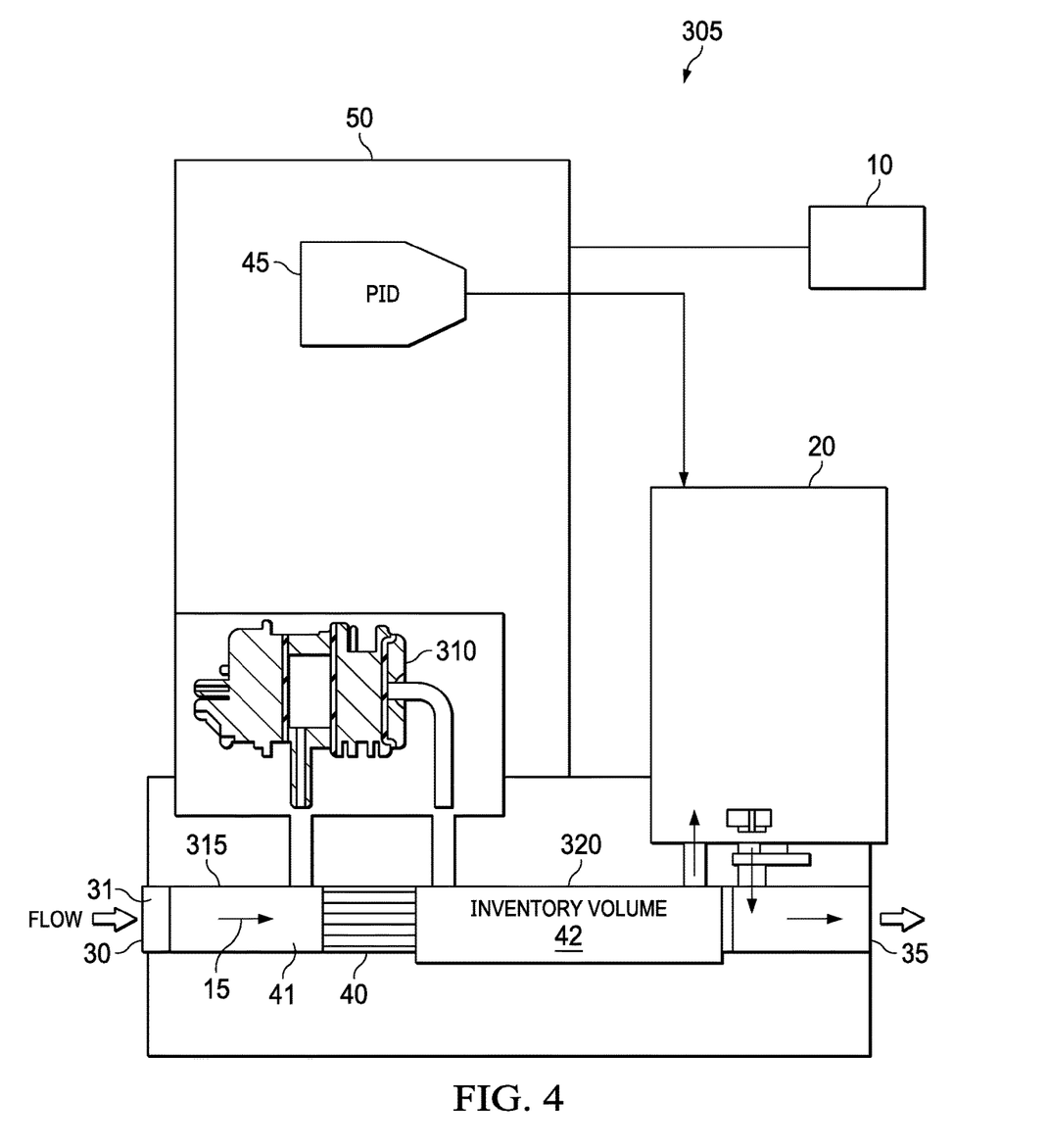
FIG. 4 is an illustration of a schematic of another embodiment of a pressure-based mass flow controller with a flow sensor upstream of the valve in accordance with certain embodiments of the present disclosure.

FIG. 4 illustrates an alternative embodiment of an MFC, generally 305. MFC 305 is substantially similar to MFC 5 of FIG. 1; however, the combination absolute and differential pressure transducer assembly 25 of FIG. 1 has been substituted with a differential pressure transducer assembly 310 which comprises an upstream differential pressure membrane, downstream differential pressure membrane, and a differential pressure transducer similar to the upstream differential pressure membrane 120, downstream differential pressure membrane 135, and the differential pressure transducer 130 of FIG. 3. However, in this particular embodiment, there is no absolute pressure transducer co-located with the differential pressure transducer. Instead, the absolute pressure transducer may be positioned separate from the differential pressure transducer assembly 310 at a position upstream of the laminar flow element 40, for example, at position 315 in fluid communication with feed volume 41; or, alternatively at a position downstream of the laminar flow element 40, for example, at position 320 in fluid communication with inventory volume 42.

Positioning the absolute pressure transducer upstream of the laminar flow element 40, that is, at position 315 or co-locating it with the absolute pressure transducer as illustrated in FIG. 1 may improve performance in some applications by minimizing the volume of the inventory volume 42. As such, an upstream absolute pressure transducer location is the preferred location of MFC 5 and in certain embodiments of MFC 305; however, it is to be understood that positioning the absolute pressure transducer downstream of the laminar flow element 40, for example, at position 320 still provides an MFC that is sufficient for most applications.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A mass flow controller comprising:
a flow pathway through the mass flow controller; the flow pathway comprising a first cavity and a second cavity,
a laminar flow element adjacent to the first cavity and the second cavity; wherein the first cavity is upstream of the laminar flow element and the second cavity is downstream of the laminar flow element,
a combination absolute and differential pressure transducer assembly comprising:
   a third cavity in fluid communication with the first cavity,
   an absolute pressure transducer having an absolute pressure membrane and exposed to absolute pressure in the third cavity, and
   a differential pressure transducer having a first differential pressure membrane and a second differential pressure membrane and exposed to differential pressure between the third cavity and the second cavity, and
a flow control valve assembly to control a flow of fluid through the flow pathway; wherein the flow control valve assembly is downstream of the laminar flow element and the combination absolute and differential pressure transducer assembly;
a controller, wherein the controller:
   converts the absolute pressure, the differential pressure, and knowledge of fluid properties and laminar flow element characteristics into a signal indicative of mass flow rate through the laminar flow element;
   receives a setpoint signal indicative of a desired flow rate through the laminar flow element; and
   controls the valve drive signal such that the signal indicative of mass flow rate through the laminar flow element substantially matches the received setpoint signal.

2. The mass flow controller of claim 1, further comprising an inlet orifice block.

3. The mass controller of claim 2, wherein the inlet orifice block comprises an inlet diameter of about 0.010 inches to about 0.070 inches.

4. The mass flow controller of claim 1, wherein the desired flow rate of the setpoint signal is less than or equal to 10% of a flow estimate.

5. The mass flow controller of claim 1, wherein the flow pathway further comprises an outlet and wherein the outlet comprises a pressure above 2 psia.

6. The mass flow controller of claim 1, further comprising a circuit board.

7. The mass flow controller of claim 1, wherein the combination absolute and differential pressure transducer assembly is configured to sense the absolute and differential pressure upstream of the flow control valve assembly.

8. The mass flow controller of claim 1, wherein the third cavity is filled with a fluid.

9. The mass flow controller of claim 1, wherein the controller is a PID controller.

* * * * *